June 29, 1965     E. H. KIDDER     3,191,519

BARBECUE ROTARY GRILL

Filed Sept. 19, 1961     3 Sheets-Sheet 1

Ephriam Henry Kidder
INVENTOR.

June 29, 1965  E. H. KIDDER  3,191,519
BARBECUE ROTARY GRILL
Filed Sept. 19, 1961  3 Sheets-Sheet 2

Ephriam Henry Kidder
INVENTOR.

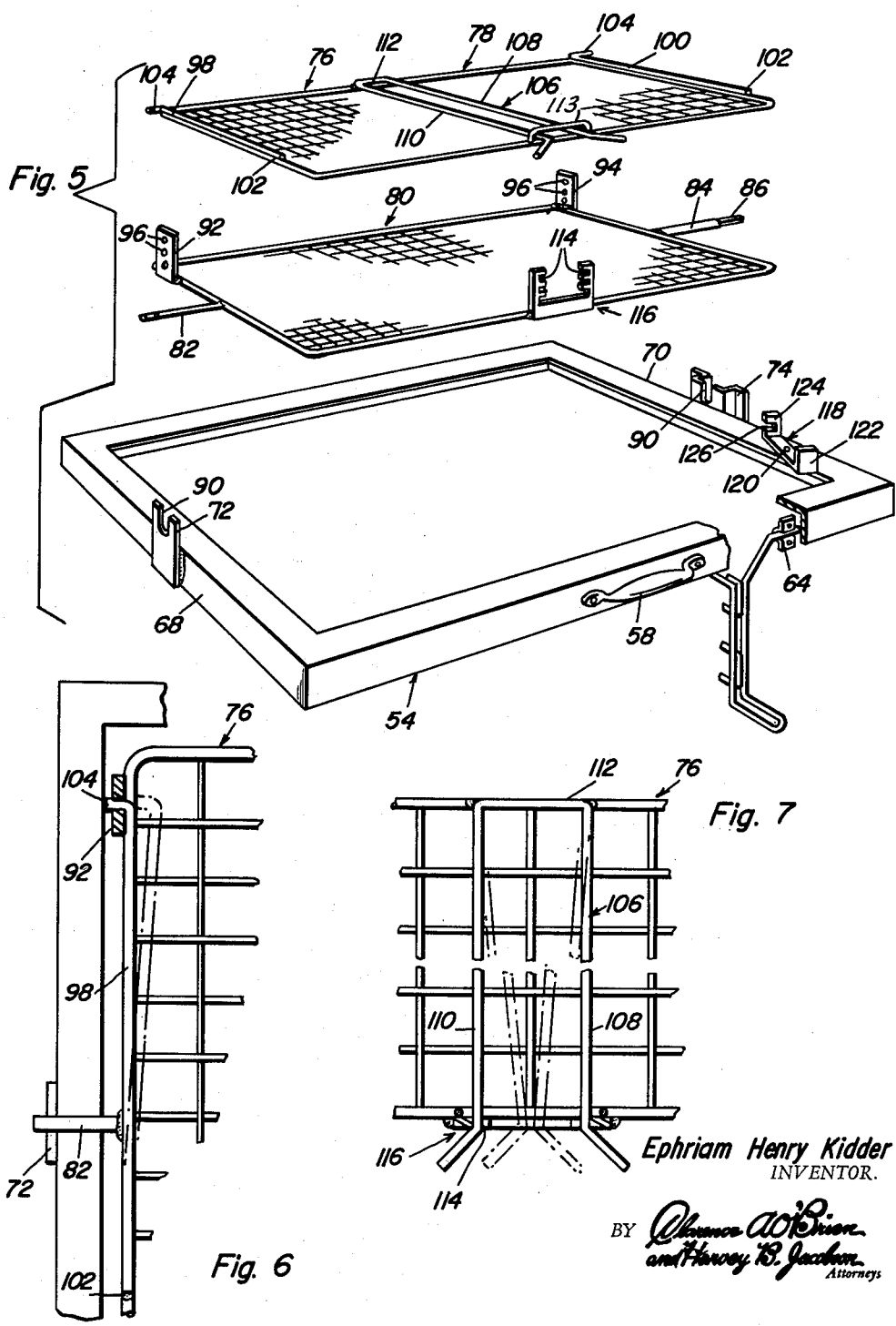

— —

3,191,519
BARBECUE ROTARY GRILL
Ephriam Henry Kidder, 617 Selma St., Cadillac, Mich.
Filed Sept. 19, 1961, Ser. No. 139,147
6 Claims. (Cl. 99—421)

This invention relates to a novel and useful barbecue rotary grill which is provided with means for rotatably mounting a spit grill or basket over a fire pan by means of a supporting frame which is mounted for movement relative to the fire pan in a manner whereby the axis of rotation of the rotary spit may be moved toward and away from the bottom of the fire pan over which the rotary spit is disposed. In this manner, the rotary spit may be positioned relative to the fire in the fire pan as desired and in accordance with the condition and heat of the fire within the fire pan and the type of food being grilled.

The rotary grill of the instant invention also includes a hood structure which is mounted for movement into and out of a position over the rotary spit and in a manner whereby the hood may be moved into and out of a position over the rotary spit regardless of its adjusted position toward and away from the fire in the fire pan.

The main object of this invention is to provide a rotary grill capable of rotatably supporting a spit in adjusted positions relative to the fire pan of the rotary grill and provided with a hood assembly mounted for movement into and out of a position disposed over the rotary spit in all adjusted positions of the rotary spit relative to the fire pan in which manner the rotary spit may be properly positioned relative to the fire in the fire pan and may be covered by means of the hood assembly as desired for establishing the most advantageous conditions under which to grill food.

A further object of this invention, in accordance with the immediately preceding object, is to provide a rotary grill which is supported by means of a mobile support structure whereby the grill may be readily moved from one location to another.

Still another object of this invention is to provide means for removably mounting the rotary grill on the supporting structure in a manner whereby the fire pan of the rotary grill may be removed from the supporting structure independently of the rotary spit supporting frame and hood assembly.

A still further object of this invention is to provide a rotary spit including a pair of substantially planar grill members with one being provided with means adapted to be rotatably journalled and the rotary spit including means for pivotally securing the planar grill members thereof along corresponding edge portions for movement of the opposite edge portions of the grill members toward and away from each other.

A still further object of this invention, in accordance with the immediately preceding object, is to provide the rotary spit with means for securing the planar grill members thereof in substantially parallel positions and with means for adjusting the spatial relationship of the grill members relative to each other.

A final object to be specifically enumerated herein is to provide a rotary grill which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an exploded perspective view of the rotary spit supporting frame and rotary spit of the rotary grill;

FIGURE 6 is a fragmentary enlarged top plan view of the rotary spit supporting frame and the rotary spit supported thereby, parts of the rotary spit being broken away and shown in section; and FIGURE 7 is a fragmentary enlarged top plan view of the rotary spit showing the manner in which the swingable edge portions thereof may be retained in adjusted spatial relationship relative to each other.

Figure 1:
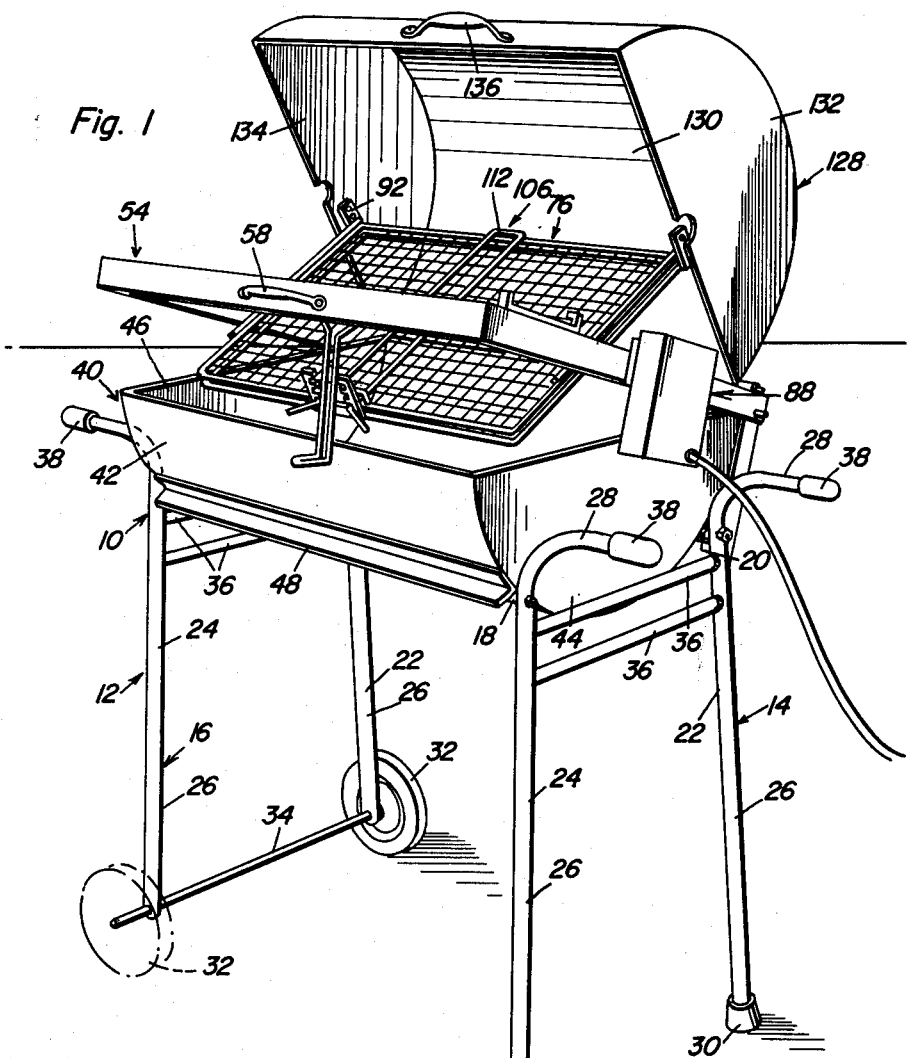
FIGURE 1 is a perspective view of the rotary grill of the instant invention shown with the rotary spit disposed in an elevated position relative to the fire pan and the hood assembly thereof in a partially open position.

Referring now more specifically to the drawings the numeral 10 generally designates the rotary grill of the instant invention.

The rotary grill 10 includes a support strucure generally referred to by the reference numeral 12 and it will be noted that the support structure 12 includes a pair of upstanding end frames generally referred to by the reference numerals 14 and 16 which are interconnected by means of parallel opposite side brace members 18 and 20. Each of the end frames 14 and 16 includes a pair of generally inverted L-shaped legs 22 and 24 that each includes a long depending arm 26 and an upper horizontally disposed arm 28. The lower end of each of the arms 26 is provided with ground engaging support means and it will be noted that one pair of support means includes a pair of foot members 30. The ground engaging support means carried by the other pair of arms 26 comprises a pair of supporting wheels 32 which are journalled on opposite ends of an axle member 34 secured between the lower ends of the other pair of arms 26. Each corresponding pair of arms 26 is interconnected by means of a pair of transverse brace members 36. The free ends of each of the arms 28 are provided with a handgrip 38 and in this manner it may be seen that the support structure 12 may be readily moved from one location to another.

The rotary grill 10 also includes a fire pan generally referred to by the reference numeral 40 which is generally semi-circular in configuration and includes a semi-cylindrical wall 42 which interconnects a pair of semi-circular opposite end walls 44 and 46. The semi-cylindrical wall 42 has mounted thereon a pair of generally L-shaped brace members 48 and 50 in any convenient manner which define abutment members for abutting engagement with the opposite side brace members 18 and 20 when the fire pan 40 is disposed on the supporting structure 12 with the lower end portion of the fire pan 40 being received between the opposite side brace members 18 and 20 and the uppermost brace members 36. In this manner, the fire pan 40 is cradled by the support structure and secured against rotation about its longitudinal axis against rotation about an upstanding axis and against longitudinal shifting relative to the support structure 12.

The rear side of the support structure 12 has a pair of support arms 52 secured thereto in any convenient manner such as by welding 53. A generally rectangular rotary spit supporting frame generally referred to by the reference numeral 54 is pivotally secured to the upper ends of the arms 52 as at 56 on opposite ends of the supporting frame 54 whereby the forward side of the supporting frame 54 which is provided with a lifting handle 58 may be swung toward and away from the corresponding side of the fire pan 40.

Figure 3:
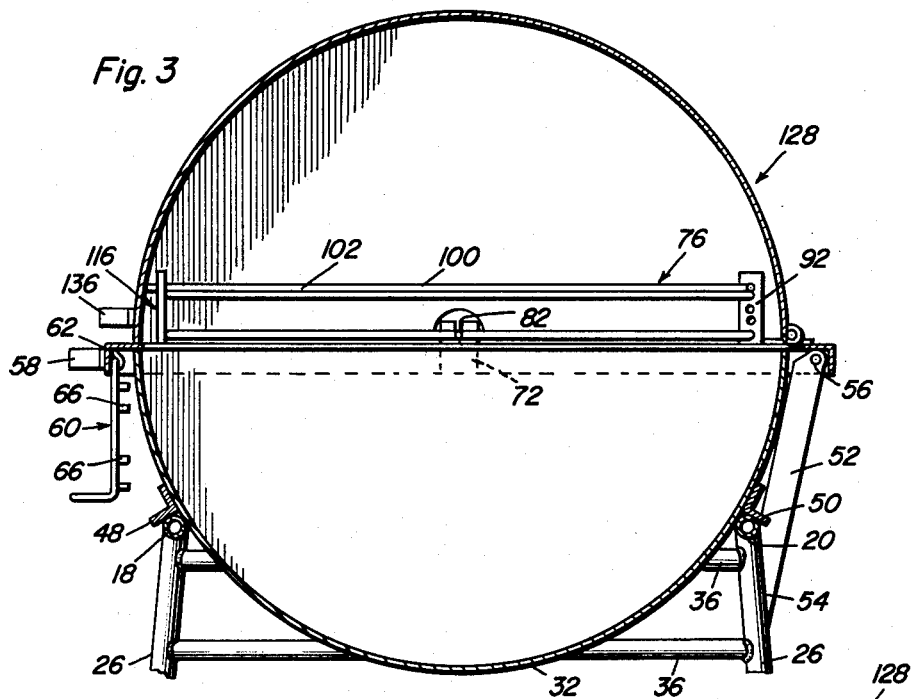
FIGURE 3 is a fragmentary enlarged vertical transverse sectional view of the rotary grill showing the hood assembly thereof in the closed position and the spit supporting frame in a lowermost position.
Figure 4:
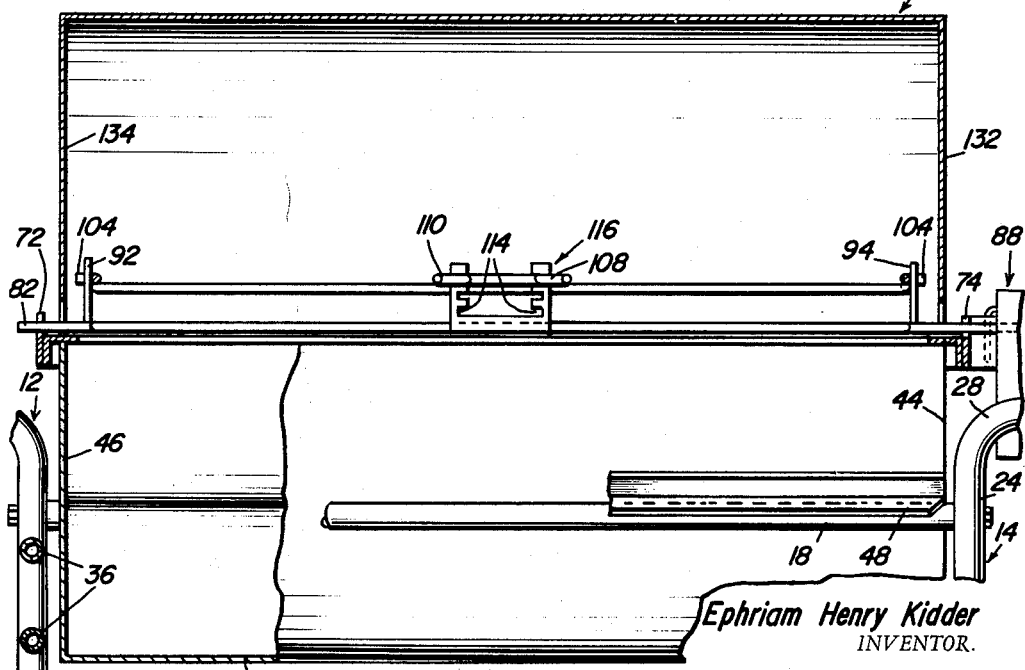
FIGURE 4 is a fragmentary longitudinal sectional view taken substantially upon a plane passing through the longitudinal centerline of the rotary grill.

It may be seen from FIGURES 3 and 5 of the drawings that the frame 54 has a generally L-shaped prop arm are generally referred to by the reference numeral 60 pivotally secured thereto as at 62 by means of journals 64 and that the L-shaped prop arm 60 is provided with a pair of laterally projecting stops 66 for engagement with the forward upper end of the semi-cylindrical wall 42. Thus, the supporting frame 54 may be adjustably positioned at its free edge over the fire pan 40.

The opposite ends 68 and 70 of the supporting frame 54 include journal portions 72 and 74 respectively for rotatably supporting the rotary spit generally referred to by the reference numeral 76.

The rotary spit 76 includes a pair of substantially planar grill members referred to in general by the reference numerals 78 and 80. Each of the grill members 78 and 80 is substantially planar and rectangular in plan. It will be noted that the grill member 80 is provided with a pair of stub axles 82 and 84 which are alined and project from opposite ends of the grill member 80. In addition, it will be noted that the free end of the stub axle 84 is provided with a noncircular end portion 86 for driving engagement with a spit motor assembly which is generally referred to by the reference numeral 88 and may be mounted on the supporting frame 54 by means of the journal portion 74. It will be noted that the journal portions 72 and 74 each define an upwardly opening notch 90 and it is to be understood that the stub axles 82 and 84 are rotatably received in the notches 90 and that the spit motor 88 is removably secured to the journal portion 74.

The grill member 80 also includes a pair of journal brackets 92 and 94 which are provided with alined apertures 96. Each journal bracket 92 and 94 includes a plurality of apertures 96. The grill member 78 includes a pair of spring arms 98 and 100 which generally parallel the opposite end edge portions of the grill member 78 and are secured to the opposite ends of the grill member 78 at corresponding ends as at 102 in any convenient manner such as by welding. The opposite ends of the spring arms 98 and 100 each includes a laterally and outwardly directed stub axle portion 104 and it will be noted that the stub axle portions 104 are substantially axially alined and generally parallel the adjacent side edge of the frame member 78. The ends of the support arms 98 and 100 on which the stub axles 104 are formed may be urged together as illustrated in FIGURE 6 of the drawings and then released with the stub axle portions 104 received in selected apertures 96. In this manner, the grill member 78 is pivotally secured to the rear side edge of the grill member 80.

A generally U-shaped spring latch member generally referred to by the reference numeral 106 includes a pair of spring arms 108 and 110 which are interconnected at corresponding end portions by means of a bight portion 112. The bight portion 112 and the corresponding ends of the arms 108 and 110 may be secured to the rear side edge of the grill member 78 in any convenient manner such as by welding and it will be noted that the free ends of the arms 110 are normally urged apart by the resiliency of the material of which the latch 106 is constructed. A generally U-shaped retaining member 113 is used to limit outward movement of the free ends of the arms 108 and 110 away from each other and it will be noted that the free ends of the arms 108 and 110 which project beyond the forward edge of the grill member 78 may be releasably engaged in a pair of the confronting notches 114 formed in the generally U-shaped keeper assembly 116 carried by the forward side edge of the grill member 80. Thus, it may be seen that the axis of rotation of the grill member 78 defined by the stub axle portions 104 may be adjusted in spatial relationship relative to the grill member 80 and also that the free ends of the grill members 78 and 80 may be secured in adjusted spatial relationship. Accordingly, the grill members 78 and 80 may be secured in substantially parallel relation at various spaced distances from each other. In this manner, foodstuffs of various thickness may be secured within the rotary spit 76.

The supporting frame 54 includes a pivoted latch member generally referred to by the reference numeral 118. The latch member 118 is pivotally secured to the frame 54 for movement about an axis extending at substantially right angles to the medial plane of the frame 54 by means of pivot pin 120. One end of the latch member 118 is laterally directed upwardly as at 122 and comprises a handle portion and the other end of the latch member 118 is also upwardly and laterally directed as at 124 and provided with a notch 126 which may be releasably engaged with either of the grill members 78 and 80 to retain the spit 76 in position substantially paralleling the medial plane of the support frame 54.

Figure 2:
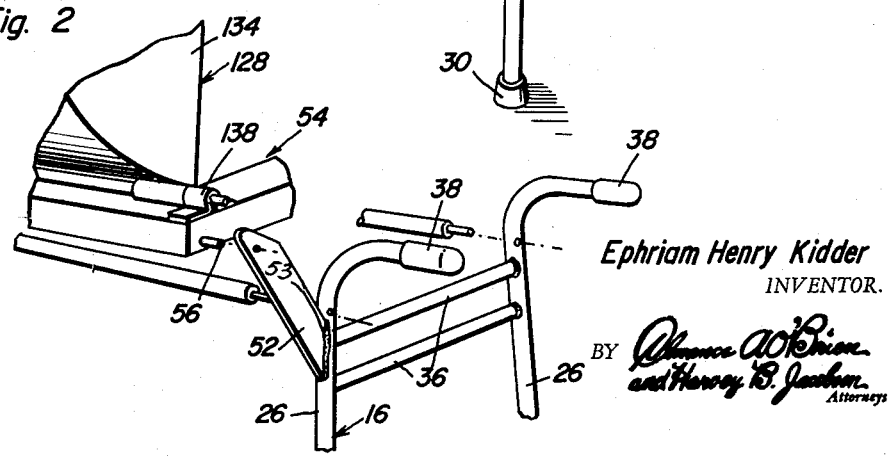
FIGURE 2 is a fragmentary enlarged exploded perspective view of a portion of the rotary grill illustrating the manner in which the hood assembly and spit supporting frame are pivotally secured to the support structure of the rotary grill.

From FIGURES 1 and 2 of the drawings it will be seen that the rotary grill 10 also includes a hood assembly generally referred to by the reference numeral 128. The hood assembly 128, is similar to the fire pan 40 and includes a generally semi-cylindrical wall 130 which is interconnected at opposite ends by means of semi-circular end walls 132 and 134. The forward side edge of the hood assembly 128 includes a lifting handle 136 and the rear side edge portion thereof is pivotally secured to the support frame 54 by means of journals 138.

It will be noted that the hood assembly 128 is mounted for pivotal movement relative to the support frame 54 and may be moved into and out of a closed position with the lower edges of the semi-cylindrical wall 130 and the semi-circular end walls 132 and 134 disposed in contacting relation with the upper surfaces of the frame 54. As the hood asembly 128 is mounted directly on the support frame 54, the positioning of the support frame 54 relative to the fire pan 40 in no way interferes with the opening and closing of the hood assembly 28.

In operation, the fire pan 40 may be removed for the purpose of starting a fire therein. Then, after the fire has been started in the fire pan 40, it may be placed in position in the support structure 12. Then, the rotary spit 76 may have its stub axle portions 82 and 84 journalled in the journal portions 72 and 74 of the frame 54. The spit motor 88 may then be secured to the journal portion 74 and operatively connected with the noncircular end portion 86 of the stub axle 84.

Assuming that the hood assembly 128 is pivoted to an open position such as that illustrated in FIGURE 1 of the drawings, the frame 54 may be lowered to its lowermost position. Then, the forward side edge of the grill member 78 may be swung away from the corresponding portion of the grill member 80 and foodstuffs may be placed between the grill members 78 and 80. Then, the free end of the grill member 78 may be secured to the forward end of the grill member 80.

If it is desired to enclose the foodstuffs being cooked, the hood asembly 128 may be lowered. However, if it is desired to position the foodstuffs a greater distance away from the fire in the fire pan, the frame 54 may be propped in an upper position. Then, the hood assembly 128 may be pivoted to an open position if it is desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary spit basket assembly adapted to be mounted over and movable toward and away from a fire pan, comprising a support structure, a spit basket supporting frame, means pivotally mounting the rear of the frame to the support structure, means for maintaining said frame in a plurality of pivotally adjusted positions, a spit basket, means rotatably mounting said basket on said frame, means for releasably fixing the spit basket in a plane substantially parallel to the plane of the frame, a hood, and means pivotally mounting the rear of the hood to the rear of the frame whereby said hood is movable with said frame and relative thereto, said hood being of a size so as to engage the upper surface of the frame about the entire extent thereof, thus being capable of completely enclosing the upper portion of the spit basket regardless of the orientation of the frame.

2. The structure of claim 1 including a fire pan, said support structure including a pair of upstanding end frames spaced apart at their upper ends and interconnected by means of a pair of generally parallel opposite side brace members, the opposite sides of said fire pan including abutment means releasably engageable with said side brace members for removable cradling support of said fire pan thereby.

3. The structure of claim 1 wherein the means for maintaining the frame in a plurality of pivotally adjusted positions consists of an arm affixed to and depending from the front side of the frame, said arm including a plurality of laterally projecting vertically spaced stops adapted to selectively engage a subjacent fire pan.

4. The structure of claim 1 wherein said means for releasably fixing the spit basket in a plane substantially parallel to the plane of the frame consists of a latch member pivotally secured to the frame and movable in a plane parallel to the frame into and out of locking engagement with the spit basket when the spit basket is orientated substantially parallel to the frame.

5. The structure of claim 1 wherein said spit basket consists of a pair of substantially planar superimposed parallel grill members, a pair of horizontally aligned vertically projecting brackets secured on opposite sides of the lower grill member adjacent the rear thereof, said brackets being provided with a plurality of vertically spaced horizontally aligned apertures therein, the upper grill member having the rear thereof positioned between said brackets, and a pair of outwardly projecting stubs resiliently mounted on said second grill member with the outer ends thereof projecting outwardly beyond the inner face of the adjacent bracket, said stubs being releasably securable within predetermined pairs of said aligned apertures.

6. A rotary spit basket assembly adapted to be mounted over and movable toward and away from a fire pan, comprising a support structure, a spit basket supporting frame, means pivotally mounting the rear of the frame to the support structure, means for maintaining said frame in a plurality of pivotally adjusted positions, a spit basket, means rotatably mounting said basket on said frame, means for releasably fixing the spit basket in a plane substantialy parallel to the plane of the frame, a hood of a size so as to receive the upper portion of the spit basket, and means pivotally mounting the rear of the hood to the rear of the frame whereby said hood is movable with said frame and relative thereto, thus being capable of completely enclosing the upper portion of the spit basket regardless of the orientation of the frame.

References Cited by the Examiner

UNITED STATES PATENTS

| 1,564,668 | 12/25 | Hageman | 16—171 |
| 2,058,172 | 10/36 | Myers. | |
| 2,148,879 | 2/39 | Rossini et al. | 99—402 |
| 2,202,537 | 5/40 | Rossini et al. | 99—402 |
| 2,627,854 | 2/53 | Sava | 126—25 |
| 2,681,001 | 6/54 | Smith | 99—402 |
| 2,792,773 | 5/57 | Barker | 99—421 |
| 2,839,989 | 6/58 | Persinger | 99—427 X |
| 2,895,408 | 7/59 | Glenny | 99—427 |
| 2,909,170 | 10/59 | Hathorn | 126—25 |
| 2,925,771 | 2/60 | Avetta | 99—427 X |
| 2,983,218 | 5/61 | Persinger | 88—427 |
| 3,038,676 | 6/62 | Mayer | 16—171 X |

ROBERT E. PULFREY, *Primary Examiner.*

GEORGE A. NINAS, JR., JEROME SCHNALL, LAWRENCE CHARLES, *Examiners.*